United States Patent [19] [11] 4,295,121
Enser et al. [45] Oct. 13, 1981

[54] DEVICE FOR OPTICAL CHARACTER READING

[75] Inventors: Mats A. Enser, Vändstigen; Lars O. Hallberg, Stålvägen; Nils G. Stalberg, Jaktstigen, all of Sweden

[73] Assignee: International Business Machines Corporation, Armonk, N.Y.

[21] Appl. No.: 95,832

[22] Filed: Nov. 19, 1979

[30] Foreign Application Priority Data

Jan. 16, 1979 [SE] Sweden .............................. 7900362

[51] Int. Cl.³ .............................................. G06K 9/34
[52] U.S. Cl. ............... 340/146.3 MA; 340/146.3 SG; 340/146.3 H
[58] Field of Search ............... 340/146.3 MA, 146.3 S, 340/146.3 AG, 146.3 H; 358/260, 167, 221

[56] References Cited

U.S. PATENT DOCUMENTS

| 3,694,807 | 9/1972 | Bond et al. ................. 340/146.3 SG |
| 3,699,536 | 10/1972 | Roberts ...................... 340/146.3 MA |
| 3,930,231 | 12/1975 | Henrichon, Jr. et al. ....... 340/146.3 MA |
| 3,949,162 | 4/1976 | Malueg ................................. 358/167 |
| 3,962,681 | 6/1976 | Requa et al. ............... 340/146.3 MA |
| 4,045,773 | 8/1977 | Kadota et al. .............. 340/146.3 SG |
| 4,047,152 | 9/1977 | Giuliano et al. ........... 340/146.3 AG |
| 4,075,605 | 2/1978 | Hilley et al. ............. 340/146.3 MA |
| 4,122,443 | 10/1978 | Thaler et al. ............ 340/146.3 MA |
| 4,186,378 | 1/1980 | Moulton ................... 340/146.3 MA |

Primary Examiner—Leo H. Boudreau
Attorney, Agent, or Firm—Paul M. Brannen

[57] ABSTRACT

A device for optical character reading comprising an optical reading unit, a video detector, a segmenting unit, a video buffer, a recognition unit and a controlling micro computer. The computer controls the setting of the threshold value in the video detector, and calculates by means of profile data received from the segmenting unit coordinates for a starting point for recognizing a character in the recognition unit. A comparator in the recognition unit compares bit by bit mask bits from a read only storage with corresponding data bits from the video buffer and stores the result into a status register. A recognized character is transferred from the read only storage to a character register, the computer is interrupted and a character is transferred from the recognition unit to the computer.

The video detector comprises selectively connectable and computer controlled attenuation resistors for setting up a threshold signal curve simulating the form for the video signal curve.

11 Claims, 4 Drawing Figures

DEVICE FOR OPTICAL CHARACTER READING

The present invention relates to a device for optical character reading and more specifically to such a device of low speed and low cost type suitable to be used in a terminal unit for reading substantially numeric information on checks or similar documents.

A character reader device or a character recognition device can operationally be divided into three main parts. The first one comprises a video detector detecting white and black spots on the document, the second one comprises a locating unit, which detects the location of the character on the document and the third unit comprises a recognition unit for recognizing the character. An example of such known character detecting and identifying devices are described in U.S. Pat. Nos. 3,699,536; 3,949,162 and in the British Pat. No. 1,423,010. The U.S. Pat. No. 3,949,162 describes a video detecting system using a number of photocells as sensing elements. The U.S. Pat. No. 3,699,536 describes a system where detected video data are consolidated by means of vertical and horizontal profiles and are compared with given character masks. The British Pat. No. 1,423,010 describes a similar character recognition system whereby the character recognition is based mainly on identifying certain characteristic regions in a character. A drawback for these known optical character recognition devices is that they tend to be complicated and a large number of expensive circuits are needed. Consequently, if an optical character reader should be used in a simple small terminal unit, these previously known devices will be too voluminous and too expensive. A direct simplification of these complicated circuits in previously known systems will easily lead to a lack of detection and identification of some characters on a document.

In accordance with IBM Technical Disclosure Bulletin, Vol. 18, No. 5, October 1975, page 1461–1464, an optical pattern identification system is shown comprising two independent processing units, one for character recognition and one micro processor for monitoring purposes and for decision making. However, this system will not solve the problem of a simple and effective optical character reading device.

It is an object of the invention to provide an improved device for optical character recognition of low speed and low cost.

It is another object of the invention to provide a device for optical character reading of numerical text on checks or similar documents.

Still another object of the present invention is to provide a simple device for optical character reading suitable to be used in a terminal unit, which is connected as a data input unit to a host system.

It is still another object of the present invention to provide a device for optical character reading capable of reading and identifying characters on a document having a normal background noise, whereby the character blackness varies within certain tolerances.

The objects of the invention are accomplished by means of a device for optical character reading comprising a number of independently operated units including a video detector unit, a segmenting unit, a recognition unit and a controlling micro processor, which is connected to these units and which performs selective control functions and complementary functions.

The foregoing and other objects, features and advantages of the invention will be apparent from the following more particular description of a preferred embodiment of the invention, as illustrated in the accompanying drawings.

The invention will now be described in connection with the following figures.

FIG. 1 discloses a block scheme of the device according to the present invention.

FIG. 2 discloses a pattern of data bits in the video buffer according to FIG. 1.

FIG. 3 discloses a wiring diagram of the video detector unit according to FIG. 1.

FIG. 4 discloses a block diagram of the recognition unit according to FIG. 1.

DETAILED DESCRIPTION

Figure 1:
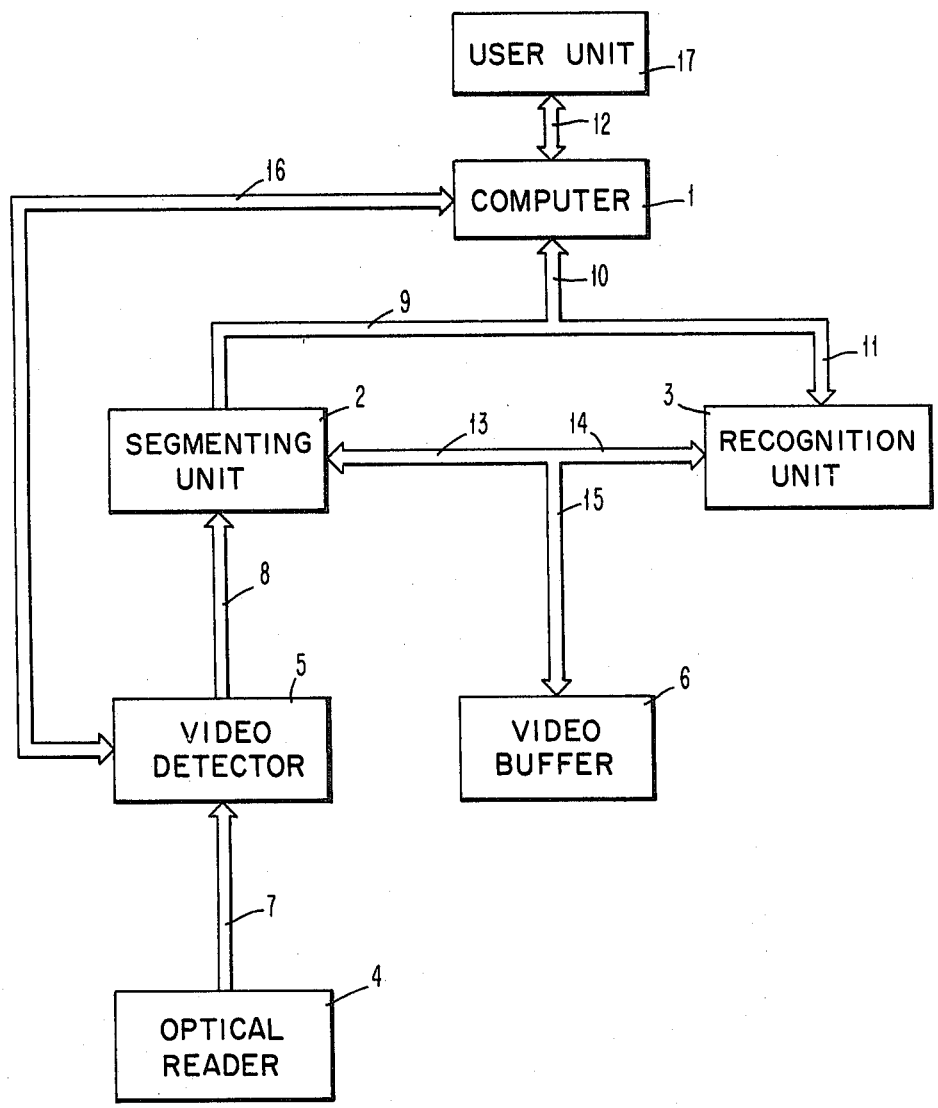

FIG. 1 discloses a computer 1, which preferably is a micro computer. A segmenting unit 2 is connected over buses 9 and 10 to said computer. A recognition unit 3 is connected over a branch 11 of said bus to the computer 1. A video buffer 6 is connected via a bus 15, which branches to a bus 14 to the recognition unit and via a second branch 13 to the segmenting unit 2. An optical reader 4 is connected by means of a bus 7 to a video detector 5, which is connected over a bus 8 to the segmenting unit 2. The computer 1 is also connected over a bus 16 to the video detecting unit 5. The output for computer 1 is connected over an output channel 12 to a user unit 17.

The optical reader 4 is part of a document reading station comprising an illuminating unit, a document transporting unit and a number of light sensitive photocells, not shown. When the document passes the optical reading station the photocells detect light variations on the document.

This optical reader is per se a conventional one and does not represent any specific part of the present invention.

The device for optical character recognition according to FIG. 1 operates so that the video detector unit 5 will first detect the video signals received from the optical reader 4. These video signals are received as serial signals in analog form at the video detector and are converted into binary digital signals having a value 1 or 0. This detection is controlled by the computer 1 over the line 16, whereby the computer 1 will set a suitable threshold for the video detector unit 5.

The detected data bits from the video detector unit 5 are transferred over the bus 8 to the segmenting unit 2. This transfer is performed serially by bit.

The segmenting unit will assemble the incoming video data bits into groups in a way which will be described later, and further it will retransfer each video data bit over the buses 13 and 15 to the video buffer 6. The video buffer 6 will store continuously all incoming data bits.

When the segmenting unit 2 has assembled video data bits according to given rules, information about these data bits will be transferred over buses 9 and 10 to the computer 1. According to this assembled data information the computer 1 will calculate coordinates for each character to be recognized. Then these coordinates will be transferred over the buses 10 and 11 to the recognition unit 3. The recognition unit 3 will then recognize each character by means of the coordinates received from the computer 1, and by means of video data bits stored in the video buffer 6, which video data bits are transferred to the recognition unit 3 over buses 15 and 14. When the recognition unit 3 has succeeded in recognizing a character, this information will be transferred to computer 1. If, however, the recognition unit 3 does not succeed in recognizing a character, the computer will provide new coordinate values to the recognition unit 3 in order to start a new recognition cycle for said character.

Figure 2:
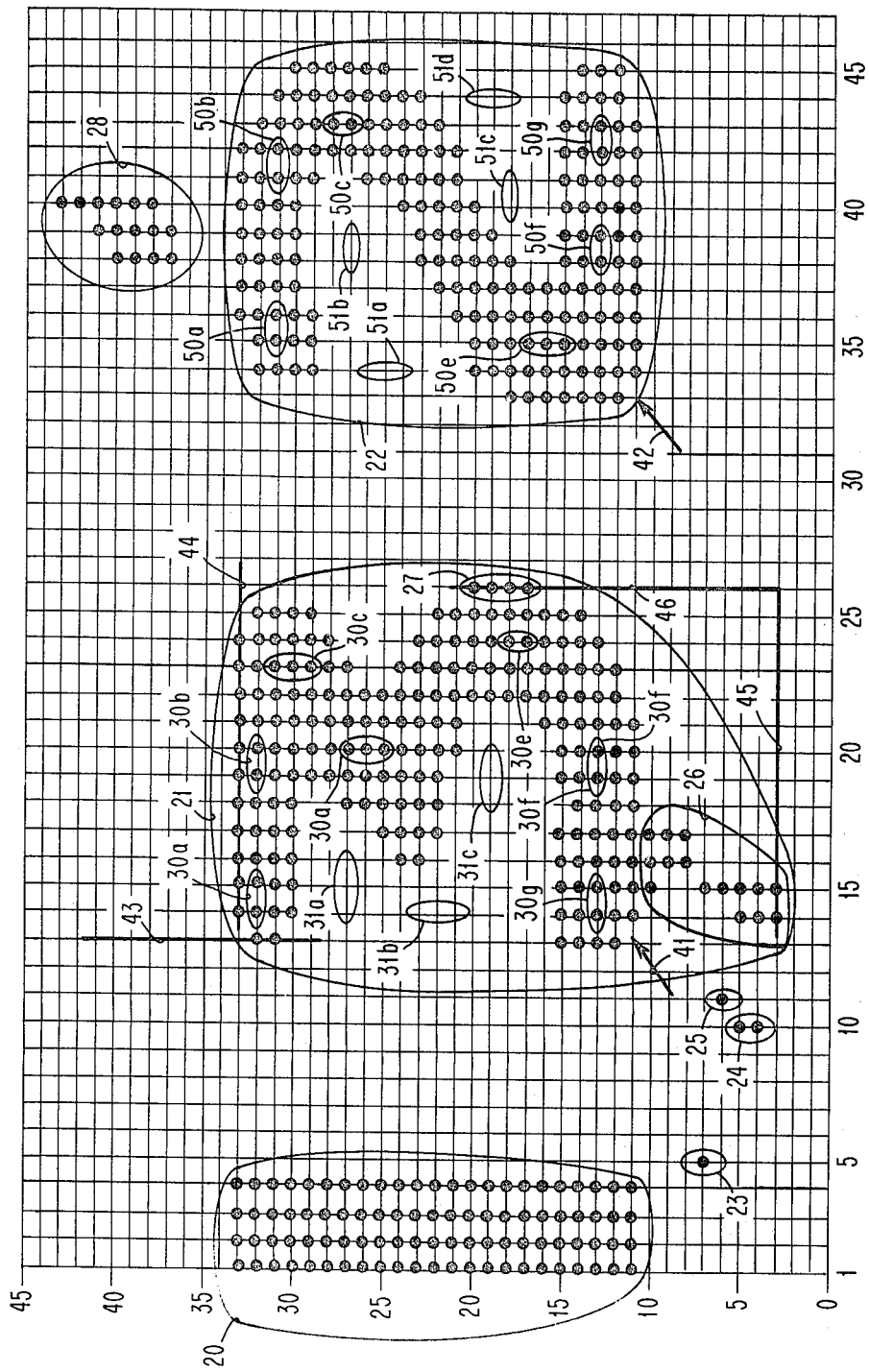

FIG. 2 is an example of the video buffer 6. This buffer comprises preferably a number of storage positions arranged in rows and columns, for example 64 rows and 124 columns. FIG. 2 shows then a part of this buffer.

It is supposed that the optical reading unit 4 in FIG. 1 comprises 64 light sensitive photocells arranged in one row for detecting characters on a moving document. These photocells are activated one after the other and the detected value for each cell as a 0-bit for white or as a 1-bit for black is read into the first column by the video buffer 6. When such a first sweep from the optical reading unit has been stored in a first column in the video buffer, the optical reading unit will perform a second similar sweep and the result should be stored in a second column in the video buffer 6. Hence video data bits are stored in the video buffer, storage position after storage position in one column and then one column after the other. When video data in such a way has been stored up to the last column of the video buffer, the next video scan will again be stored in the first column of the video buffer. This means that the video buffer operates as a ring buffer whereby new data will be written over old data.

In accordance with FIG. 2 a pattern area 20 shows a part of a character, which preferably represents a part of a "1". The pattern area 21 shows a picture of a character "3" and the pattern area 22 discloses a picture of a character "2". Further there are shown in FIG. 2 a number of noise patterns in areas 23, 24, 25, 26, 27 and 28.

The operation of the segmenting unit 2 in FIG. 1 will now be described in connection with the patterns in FIG. 2. In this connection the effect of the four first columns in the pattern area will be ignored since this pattern relates to a previous character. When data bits for the column 5 are flowing from the video detector unit 5 to the segmenting unit 2, a black data bit will be accounted, i.e. a data bit having the value of one in the pattern 23. All the other 63 data bits will be white or zero. The segmenting unit 2 is designed not to consider a separate black data bit occurring alone during a scan. The noise pattern 23 will consequently be ignored. When scanning the columns 6 to 9 there will be only white data bits, which will not start any action in the segmenting unit. When the column 10 will be scanned there will, however, be encountered two data bits in the noise pattern 24. When column 11 will be scanned the only data bit in the noise pattern 25 will not be considered. The information about the noise pattern 24 will now be transferred from the segmenting unit 2 to the computer 1. When the pattern 24 occurs isolated it will be easy for the computer 1 to consider this as a noise pattern.

When column 12 is scanned there will be only white data bits encountered, but when column 13 will be scanned the beginning of the character pattern in the area 21 will be encountered. The segmenting unit 2 will then indicate column 13 as a horizontal start coordinate value. Further, there will be an input from the rows 12-15 and for rows 31 and 32 to a vertical register in an OR-form. When the next column 14 is scanned the setting of the horizontal coordinate is not further influenced. However, data bits from the rows 3, 4, 5, 11-15 and 30-32 will be fed to the vertical register in OR-form. The scanning will continue column after column in the same way whereby data bits will be ORed into the vertical register until the column 26 is reached. When column 27 is scanned only white data bits will be encountered. This will be considered by the segmenting unit 2 as an end for pattern area 21. The vertical register has now ORed incoming data bits and reached the lowest value on row 3, designated as a line 45, and the highest value on row 33 designated as line 44. Further, the segmenting unit has identified column 26 as the last horizontal coordinate value.

The segmenting unit 2 has accomplished a squaring of the character pattern in the area 21 into four limiting coordinates corresponding to the lines 43, 44, 45 and 46. These coordinates are transferred as profiled data from the segmenting unit 2 to the computer 1, preferably according to the direct memory access method (DMA). The computer 1 must now analyze the result received from the segmenting unit and finally decide the starting point for the character pattern.

According to FIG. 2 it can be seen that in the pattern area 21 there is a noise area 26, which the segmenting unit 2 has not been able to identify. This means that the character pattern is eight bits too high in the vertical direction. The computer 1 recognizes this fact and can make a conclusion that the character pattern should start on the line 11 by comparing with previous characters, i.e. the previous character pattern 20 and with the succeeding character pattern 22. Hence, the computer 1 will cut out the lower part of the character patter 21 and establish a row 11 as a starting coordinate in the horizontal direction. Further, the computer keeps the coordinate value 13 as a starting point for the pattern in vertical direction. The starting coordinate point for the pattern in FIG. 2 is shown with the arrow 41. This starting coordinate value having $X_0=13$, $Y_0=11$ is transferred from the computer 1 to the recognition unit 3.

If it is supposed that a character pattern comprises 13 columns, then choosing $X_0=13$ means the information in column 26, i.e. in the area 27 will be cut out. The final result will be that computer 1 adjust the result received from the segmenting unit in such a way that the line 45 will be moved upward eight steps and the line 46 will be moved one step to the left.

The segmenting unit 2 will then continue to receive white data bits, column by column, until column 33 will be encountered in the pattern area 22. Then the pattern area 22 will be scanned column by column in the same way as previously has been described in connection with the pattern area 21. When this scanning passes columns 38, 39 and 40 the pattern area 28 will also be scanned. When the total pattern area 22 and 28 has been scanned the segmenting unit will register a start value $X=33$, an end value $X=45$ and two separate vertical areas having values $Y=11$ to $Y=33$ and $Y=37$ to $Y=43$. These values are transferred to the computer 1.

The segmenting unit 2 has this time succeeded in establishing correct horizontal coordinates but the computer 1 must now eliminate the noise pattern 28. This will be very simple since the pattern area 22 discloses 23 vertical positions whereafter there are only 7 positions in the area 28. Further, the computer 1 will see that the vertical limits are 11 and 33 for the area 22 corresponding to the values for the area 21 and 20. Hence the computer 1 decides to choose the area 22 as the pattern area to be identified. This means that computer 1 will choose the point $X_0=33$ and $Y_0=11$ as starting coordinate value, which is shown with the arrow 42. This start coordinate value will be transferred over the bus 10 and 11 from the computer 1 to the recognition unit 3 according to FIG. 1.

The recognition unit 3 according to FIG. 1 recognizes stored character patterns in the video buffer 6 by comparing the character patterns with a number of character masks stored in the recognition unit 3. This comparison makes use of so-called characteristic areas in a character mask. In accordance with FIG. 2 this means that a character mask for the character 3 comprises characteristic black bit areas 30a–30g and characteristic white areas 31a–31c. For the character 2 the character mask comprises characteristic black areas 50a–50g and white areas 51a–51d. The recognition unit 3 compares area by area the stored bits in video buffer 6 with mask values in the mask memory in the recognition unit. When equality occurs, the recognition unit informs the computer 1.

The video detector unit according to FIG. 1 will now be described in connection with FIG. 3. A video amplifier 81 is adapted to receive video signals from a video input 82. The video input 82 is preferably an input for video signals from a number of photocells, i.e. from 64 photocells, which are activated one after the other serially when a document preferably with numerical text is passing the row of photocells. These photocells are not shown in FIG. 3 since they do not constitute any special part of the present invention.

The output 83 of the video amplifier 81 is connected to a comparator 99 and via a diode 85 and a capacitor 86 to ground. The common connection 87 for the capacitor and the diode is connected to the input of an amplifier 88 having an output 89 connected to a number of attenuation resistors 92 and an attenuation circuit 91. The outputs from the attenuation resistors 92 are connected over gate circuits 93 and an output line 97 to a second input 98 for the comparator 99. The output signal from the attenuation circuit 91 is connected over an output line 94 and a branch circuit 95 and 96 to the output line 97.

A control circuit 90 comprises an interface circuit 101, a first address circuit 102, a second address circuit 104 and a counter 103, this control circuit being connected over its interface 101 to the computer 1 via a transfer line 16. The interface circuit 101 is also connected over a line 105 to the output 100 of the comparator 99. The second address circuit 104 is connected to the attenuation circuit 91 and the first address circuit 102 is connected to the gate circuits 93.

When a video signal appears at the video input 82 it will be amplified in video amplifier 81. The amplified video signal is fed over the line 83 to the comparator 99 and is compared with a threshold in order to decide if the video signal should be considered as a white signal or as a black signal, i.e. as a binary or a one.

The amplified video signal on the output line 83 has schematically been illustrated as a stepformed line 106. Each step represents a video signal, which in the comparator 99 shall be digitalized to a one or to a zero. The levels 108 and 109 represent black signals whereas all the other steps in the curve 106 represent white signals. The maximum white value is shown with line 110.

The characteristic curve form for the video signal, i.e. the stepformed convex curve 106 is due to the location of the illuminating source as compared to the illuminated document and the sensing photocells. The curve 106 will have its convex form due to the fact that the outer photocells in the row are getting somewhat lesser reflected light as compared to the photocells which are located in the middle of the row. Evidently it is important that the threshold level illustrated by the curve 107 for each line scan follows the video signal form as much as possible. This is preferably accomplished by the attenuating resistors 92 and the gate circuits 93.

If the capacitor 86 has a relatively long time constant the amplifier 88 will provide a maximum white signal on its output 89 corresponding to the level 110. This maximum level will be attenuated during a line scan selectively by means of the gating circuits 93 connecting various attenuating resistors 92 so that the stepformed curve 111 will be reached. The stepping curve 111 will preferably simulate the form of the video signal curve 106. This simulation is for instance achieved by an address circuit 102 and a counter 103 in the control circuit 90. In the beginning of the line scan the gate circuits 93 are connecting a relatively high attenuation to the output of the amplifier 88. During the line scan this attenuation is step by step reduced to a minimum value, whereafter the attenuation will be increased step by step to the end of the line scan. The address circuit 102 will be preset by means of the computer 1 and is then stepped synchronously with the line scan, i.e. at the same speed as pulses appear on the video signal input 83 for the comparator, by means of the counter 103 so that the wanted selective atentuation is accomplished.

The whole attenuation level 111 can then be lifted or lowered by means of the attenuation circuit 91. This attenuation circuit is preferably controlled from the second address circuit 104. The computer 1 can sense the output signal of the comparator 99 by means of the line 16, the interface 101 and the line 105. Then the computer can change the attentuation of the attenuation circuit 91 by means of the line 16, the interface 101 and the address circuit 104 so that the suitable threshold 107 will be reached. The threshold signal curve 107 will now follow the form of the video signal curve 106.

Figure 4:
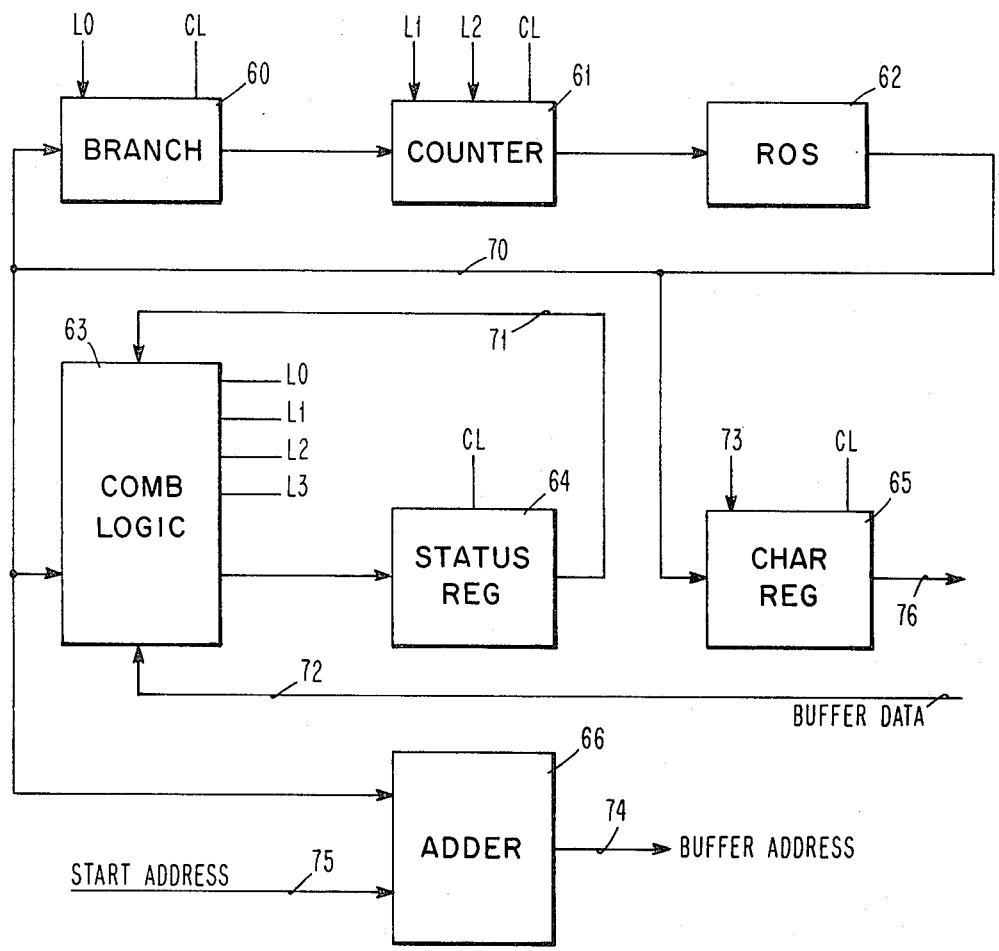

The recognition unit 3 in FIG. 1 will now be described in detail as shown in FIG. 4.

The recognition unit comprises a branch register 60, an instruction counter 61, a read only storage 62, a combination logic circuit 63, a status register 64 and a character register 65 and an adder 66. The read only storage 62 comprises a number of comparing masks in the form of a number of instructions, which will be described later. The purpose of the instruction counter 61 is to step the instruction reading from the read only storage 62 instruction by instruction. The purpose of the branch register 60 is to load a new value in the instruction counter 61 when it appears that the actual mask from the read only storage 62 does not compare with the character to be recognized. The purpose of the adder 66 is to combine the start coordinate address received from the computer with a coordinate address received from the read only storage 62 and then to address the video buffer with this combined address. The purpose of the combination logic circuit 63 is to compare the data bit of the addressed position in the video buffer with the mask bit received from the read only storage 62 and according to this comparation to set certain latches in the status register 64. The purpose of the character register 65 is to receive a character code from the read only storage 62 when a similarity is encountered between the mask value from the read only storage 62 and the character to be recognized in the video buffer, and to transfer this character to the computer 1. The circuits 60, 61, 64 and 65 are driven by clock pulses on the lines designated CL.

The recognition of a character will now be described in detail by means of FIG. 2 and FIG. 4. It is supposed that the recognition unit shall recognize a character "3", which is stored in the video buffer in the area 21 according to FIG. 2. It is further supposed that the recognition starts with comparing the character with masks for a "1", when the marks for a "2", then with masks for a "3", etc.

According to FIG. 4 the instruction counter 61 will first address the read only storage 62 to start character recognition by means of masks for a character "1". The first instruction comprises reading out a branch address from the read only storage 62 over the output line 70 to the branch register 60, which information contains the branching address for starting a recognition by means of a following mask character, i.e. in this case starting recognition by means of a mask character "2". Then the instruction counter is stepped further one step and the instruction will be selected from the read only storage 62. This instruction can for instance be a test instruction the purpose of which is to compare a mask bit in the instruction word with the data bit taken from the video buffer. This comparison is made in the combination logic circuit 63. If the result of the comparison is positive the combination logic circuit 63 will provide an output signal L1, which will activate the instruction counter 61 to increment its count value with a one. The instruction counter will then choose the next mask bit from the read only storage 62 to be compared with the corresponding data bit from the video buffer in the combination logic circuit 63. This comparison will continue until a fault is encountered, which will be registered in the status register 64. The setting of the status register 64 will influence the combination logic circuit 63 over the feed back 71 in such a way that the signal L2 will be fed to the instruction counter 61. This signal will initiate the instruction counter 61 to read in a value from the branch register 60, i.e. in this case the address for the mask character "2". The recognition procedure continues for the character in the video buffer by means of mask bits for the mask character "2" in the same way as previously for the mask character "1". This character recognition operation will be described in detail by means of the following table.

TABLE

| | Mask | $\Delta X$ | $\Delta Y$ | $X_0$ | $Y_0$ | X | Y | Result |
|---|---|---|---|---|---|---|---|---|
| 1. | 50a black | 2 | 20 | 13 | 11 | 15 | 31 | yes |
| 2. | 51a white | 1 | 13 | 13 | 11 | 14 | 24 | yes |
| 3. | 50b black | 8 | 20 | 13 | 11 | 21 | 31 | yes |
| 4. | 51b white | 5 | 16 | 13 | 11 | 18 | 27 | no |
| 5. | white | 6 | 16 | 13 | 11 | 19 | 27 | no fault 1 |
| 6. | 50c black | 10 | 15 | 13 | 11 | 23 | 26 | no |
| 7. | black | 10 | 16 | 13 | 11 | 23 | 27 | yes |
| 8. | 51c white | 7 | 7 | 13 | 11 | 20 | 18 | yes |
| 9. | 50d black | 6 | 10 | 13 | 11 | 19 | 21 | yes |
| 10. | 51d white | 11 | 7 | 13 | 11 | 24 | 18 | no |
| 11. | white | 11 | 8 | 13 | 11 | 24 | 19 | no |
| 12. | white | 11 | 9 | 13 | 11 | 24 | 20 | No fault 2 |

Mask "2" $X_0' = 33$, $Y_0' = 11$ Character "3"

This table relates to a recognition operation whereby an attempt is made to recognize a character "3" by a mask character "2". The character to be recognized is shown in FIG. 2 in the area 21 and the mask to be used for recognition is shown in the area 22. It should be pointed out that the mask is not stored in the video buffer but in the read only storage 62, but in order to simplify the description the mask for a character "2" is shown in FIG. 2.

It should further be pointed out that the starting point for the recognition of the character "3" is the coordinates $X_0 = 13$ and $Y_0 = 11$ at the start coordinate point 41 in FIG. 2. These start coordinates have been calculated by the computer 1 by means of information received from the segmenting unit 2. It should further be recognized that the mask coordinates $\Delta X$ and $\Delta Y$ are counted from the start coordinates and are stored in the read only storage 62. In order to make the understanding of the description easier a pseudocoordinate value $X_0 = 33$ and $Y_0 = 11$ for the starting point 42 in FIG. 2 has been given in the table.

According to the uppermost row in the table the recognition starts with the mask area 50a, which is a black area. The first comparison concerns the left mask bit in the area 50a according to FIG. 2. This point is located on $\Delta X = 2$ and $\Delta Y = 20$ from the pseudocoordinate point 42. When these transfer coordinates $\Delta X$ and $\Delta Y$ are added to the start coordinates $X_0$ and $Y_0$ the resulting coordinates $X = 15$ and $Y = 31$ will be reached, which provides the black marking. Consequently, this will give a "yes" result for the comparison.

According to FIG. 4 the operation for the first line in the table means that an instruction word will be read out from the read only storage 62. This instruction word contains the coordinate values $\Delta X = 2$ and $\Delta Y = 20$, which are transferred over the line 70 to the adder 66. The adder 66 receives over its second input line 75 the start address, i.e. $X_0 = 13$ and $Y_0 = 11$. The adder 66 will create the sum of these coordinates and will send out on its output line 74 an address value $X = 15$ and $Y = 31$ to the video buffer 6 in order to read out the data bit from this position. The video buffer reads out the data bit from this position containing a one corresponding to a black position and will send this data bit along the line 72 to the combination logic circuit 63. The instruction word from the read only storage 62 comprises also a mask bit 1 and this bit is compared in the combination logic circuit 63 with data bit from the video buffer. Due to an equal condition the combination logic circuit 63 will provide a signal L1 in order to update the instruction counter 61 and thereby to initiate the read out of the instruction for the row 2 from the read only storage 62. It should be pointed out that the second mask bit in the area 50a (X'36, Y'31) does not need to be compared with the corresponding data bit from the video buffer due to the fact that the mask bits in an area are ORed in order to provide a result.

Then the operation continues according to row 2 in the table by reading out an instruction from the read only storage 62, combining in the adder 66 the displacement coordinates with the start coordinates whereafter the combination logic circuit 63 compares the actual white mask bit with the addressed buffer bit. A result of this comparation will also be a yes answer. In a similar way the operation of the third table row will result in a yes answer.

The table row number four related to the white mask area 51b will, however, result in a non-equal comparation between the white mask bit and the black bit. The combination logic circuit 63 will then set a status latch in the status register 64 in order to indicate that the first comparison in a mask area has produced a no result. The fifth row in the table will then test the second mask bit in the white area 51*b* which also produces a no result. The combination logic circuit 63 will now set up a fault indicator in the status register 64 in order to indicate that a mask area is encountered which has no correspondence in the character to be identified.

The recognition unit can now perform a branching operation to the next recognition cycle comprising mask areas for the character 3.

According to another embodiment of the invention the recognition unit will accept one faulty mask identification and will branch only when a second error has been encountered. The rows 6–12 in the table are related to this second embodiment.

Row 6 in the table discloses an identification operation for comparing a first black bit in the area 50*c* with a corresponding bit in the video buffer. This comparison will provide a no result leading to setting up a latch circuit in the status register 64. The operation on the row 7, however, will produce a yes result for the second bit in the area 50*c*. The previously set latch in the status register 64 can then be reset. Then the operation continues according to rows 8 and 9 in the table providing a yes result.

On row 10 the first white mask bit in the area 51*d* is compared to the corresponding data bit and the result will be a no, which will be stored in the status register 64. Equally a no result will be stored for the comparison according to rows 11 and 12. The status register 64 will now inform the combination logic circuit 63 through the feedback 71 that two faulty mask areas have been encountered, which means that the mask "2" does not compare with the character to be recognized. The combination logic circuit 63 will then provide an output L2, which will reset the instruction counter 61 and provide a transfer of the start address for the character mask "3" from the branch register 60 to the instruction counter 61.

The new cycle for testing mask parts related to the character "3" will again start with a branch address to the next character mask for the character "4" to be loaded into the branch register 60 and this will be performed by means of a signal L0 provided by the combination logic circuit 63 to the branch register 60 simultaneously with the read out of the first instruction from the read only storage 62. Then follows the testing of mask bits against video data bits mainly in the same way as has been shown in the table. When mask bits are tested for the character 3 against data bits in the character 3, it is supposed that the bit comparison this time will provide a yes answer for the whole mask pattern.

The combination logic circuit 63 will then set up an indicator in the status register 64 for a valid character. The combination logic circuit 63 will then provide a signal L3 to initiate the character register 65 for reading in a character code from the read only storage 62, this character code corresponding to the recognized character "3". Then the recognition unit 3 will send in interrupt signal to the computer 1 meaning that a recognized character is availabe at the character register 65. The computer 1 will then read the recognized character from the character register 65 over the channel 76.

If the recognition unit 3 does not succeed in recognizing a character even when all mask characters have been tested, the computer 1 can send a new start coordinate address to the recognition unit whereafter the recognition cycle will be operated once again. In the case that also this cycle will result in a non-recognized character the computer may send still another start coordinate address or a number of start coordinate addresses in order to perform a number of additional recognition cycles. Preferably the start coordinate address will be updated with one coordinate unit for each new start coordinate address.

It should be pointed out that the computer 1 can be set to change start coordinate addresses in an intelligent way in order to reach the best probability for a successful character recognition.

According to another embodiment of the invention the recognition of a character will not be interrupted when a mask will provide a positive result. In this case the recognition will continue with the remaining character masks. It might happen that another character mask will compare with the character to be recognized, which will lead to a conflict about which one of the identified characters is the right one. It will then be up to the computer 1 to decide about the conflict.

A device has been described for optical character recognition comprising relatively independently working units, i.e. (see FIG. 1) a video detector unit 5, a segmenting unit 2, a recognition unit 3 and a controlling computer 1, preferably a micro computer.

Figure 3:
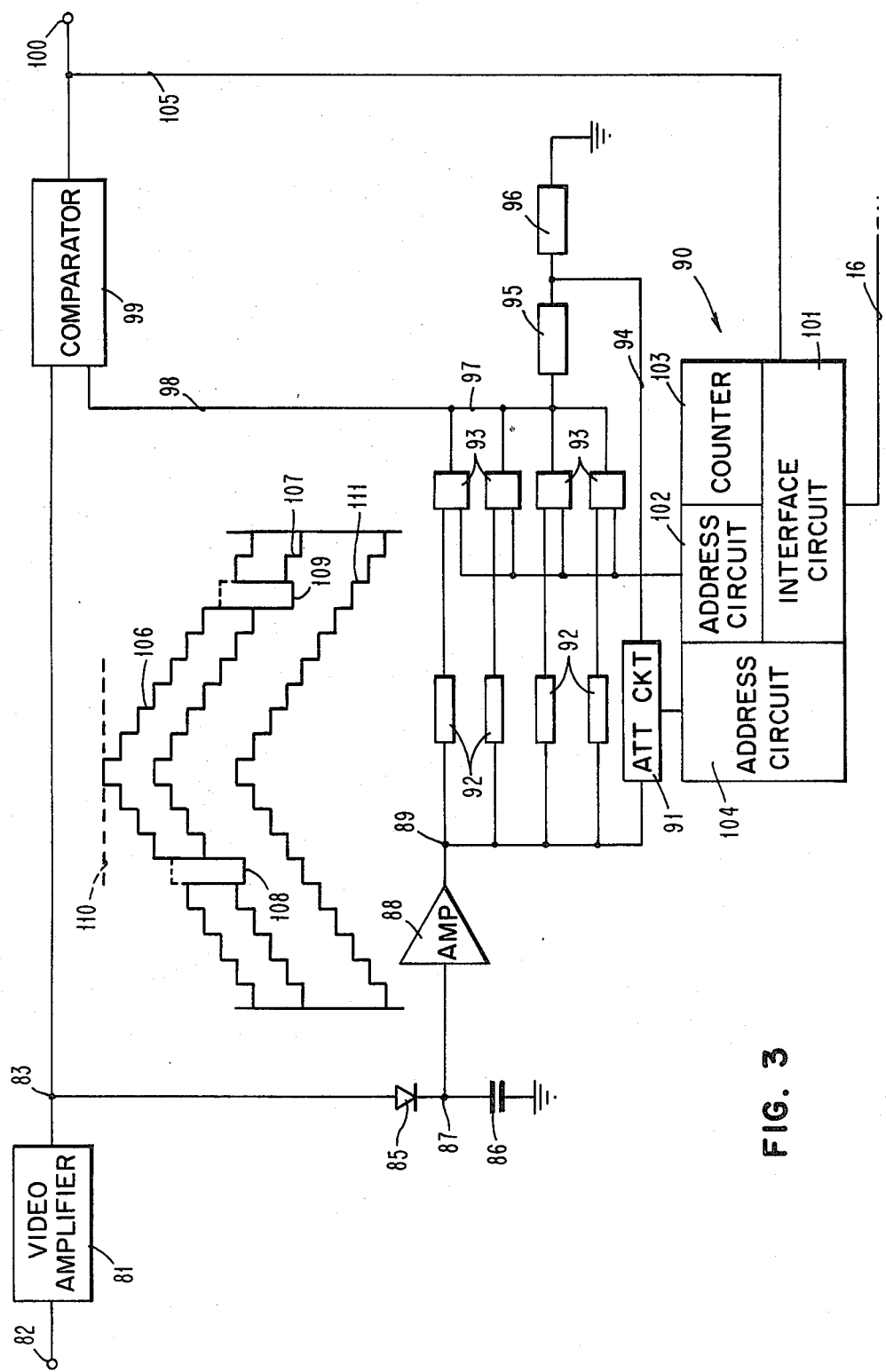

Referring to the threshold in the video detector unit it is most suitable that the stepping of the threshold curve 111 in FIG. 3 is generated in the video detector unit itself by means of the counter 103 and the addressing circuit 102, since this is a fast operation, whereas the loading of the address circuit 102 preferably comprising a memory circuit (RAM) is controlled by the control computer 1. This loading of the address circuit 102 controls the form of the threshold curve 111 and is a low speed operation needing an intelligent decision and hence it is a suitable function for the controlling micro computer. The adjustment of the threshold curve upwards from the position 111 to the position 107 in the relation to the position of the video signal curve 106 is set by means of the address circuit 104.

The segmenting unit 2 in FIG. 1 should work with a fast bit speed in order to collect horizontal and vertical profiles. On the contrary the calculation of start coordinates including intelligent decisions for cutting certain profiles is a slow operation with a character speed and is consequently suitable for the micro processor.

The recognition unit is also working with bit speed and leaves the difficult task for using start coordinates to the micro processor. New start coordinates are selected with a slow character speed, but they can be chosen in an intelligent way in order to reach an optimal probability for character recognition.

It is further an advantage to use the storage in the micro computer as a character buffer. If the user unit 17 in FIG. 1 is a data collecting loop for terminal units, the micro computer must be able to communicate with this loop and to transfer character data from its character buffer to the loop in a per se conventinal way.

The invention is not restricted to an optical character reading device being the only part in the terminal unit. On the contrary it might be practical to add a printer to this character reader device, which printer is located in the document path after the optical reading unit. The printer might then print data which have been transferred from the data buffer of the micro computer which are originated either from the optical reading unit or from the data communication loop. The micro computer might also serve the printer with necessary control signals.

We claim:

1. Device for optical character reading comprising an optical reading unit, a video detector, a segmenting unit, a video buffer, a recognition unit, a user unit and a control computer, characterized in that said control computer 1 is adapted to receive horizontal and vertical information for detecting video patterns 20, 21, 22, and 28 from the segmenting unit 2 and that said controlling computer 1 further is adapted to calculate coordinates for a start point 41, 42 for a character to be recognized, whereby the computer sends coordinate values for the start point to the recognition unit 3 and that the recognition unit thereafter, starting from the starting point, recognizes a character and returns the recognition result to the computer.

2. Device according to claim 1, characterized in that said video buffer 6 is connected to the segmenting unit 2 for receiving video data bits, and to the recognition unit 3 for providing video data bits to the recognition unit for recognition purposes.

3. Device according to claim 1, characterized in that said user unit 17 comprises a printer adapted to use as data source a data buffer in said control computer.

4. Device for optical character reading comprising an optical reading unit, a video buffer 6 and a combination logic circuit 63, characterized by a read only storage 62 for transferring mask bits to the combination logic circuit, whereby said combination logic circuit compares these mask bits with video data bits received from the video buffer and provides a comparation result to a status register 64 adapted to control the transfer of a character code for a recognized character from the read only storage to a character register 65.

5. Device according to claim 4, characterized by an adder 66 adapted to add a start coordinate address 75 to an address received from said read only storage and to transfer the combined address to the video buffer for addressing a data bit, said data bit being transferred to the combination logic circuit in order to be compared with a mask bit.

6. Device according to claim 4, characterized by an instruction counter 61 for stepping the read only storage and a branch register 60 for changing the content in said instruction counter.

7. Device according to claim 6, characterized in that said status register is connected over a feed back 71 to said combination logic circuit and that said combination logic circuit by means of a second output L0, L1, L2, and L3 is connected for controlling said branch register, said instruction counter and said character register.

8. Device for optical character reading comprising a video detector unit 5, a character recognition unit 3 and a control computer 1, characterized in that said video comprises an interface circuit 101 connected to the output for a comparator 99 having a video signal input 83 and a threshold input 98, whereby said interface circuit is controllable by the controlling computer to set an address circuit 102-104 for controlling attenuation means 91, 92 provided between a threshold signal source 88 and said threshold signal input 98 in order to selectively control the threshold level at the input for the comparator according to control signals from said control computer.

9. Device according to claim 8, characterized in that said addressing circuit comprises a control circuit 102, 103 connected to a number of gate circuits 93 for selectively connecting a number of attenuation circuit 92 between the threshold signal source 88 and said threshold signal input 98 for the comparator.

10. Device according to claim 9, characterized by a video amplifier 81 having an output 83 which partly is connected to said video signal input for said comparator 99, partly to a diode 45 having an output connected partly to a capacitor 86, partly to an additional amplifier 88 operating as a threshold signal source and having an output connected to said attenuation means 91, 92.

11. Device according to claim 9, characterized in that said control circuit comprises an address circuit 102 and a counter 103 adapted to step said address circuit at the same rate as pulses 106 occur at the video signal input 83, whereby a threshold signal curve 107 is provided having a form following the form of the video signal curve 106.

* * * * *